United States Patent [19]
Higa

[11] Patent Number: 4,839,051
[45] Date of Patent: Jun. 13, 1989

[54] METHOD FOR TREATING WATER

[75] Inventor: Teruo Higa, Ginowan, Japan

[73] Assignees: Saken Co., Ltd., Fukuoka; Ryoko Co., Ltd., Tokyo, both of Japan

[21] Appl. No.: 62,351

[22] Filed: Jun. 11, 1987

Related U.S. Application Data

[63] Continuation-in-part of Ser. No. 863,575, May 15, 1986, abandoned.

[30] Foreign Application Priority Data

Sep. 12, 1985 [JP] Japan .................. 60-202281

[51] Int. Cl.$^4$ .............................................. C02F 3/32
[52] U.S. Cl. .................................... 210/602; 210/747; 210/170
[58] Field of Search ............... 210/602, 150, 151, 170, 210/747, 610, 611

[56] References Cited

U.S. PATENT DOCUMENTS
4,678,582  7/1987  Lavigne ........................... 210/602

FOREIGN PATENT DOCUMENTS
3244787  6/1984  Fed. Rep. of Germany ...... 210/602

*Primary Examiner*—Tom Wyse

[57] ABSTRACT

A method and apparatus for treating contaminated water without addition of chemical agents. A treatment zone is provided, having water-impermeable bottom and side walls, the bottom sloping stepwise from an input and to an output end. Soil is disposed within the treatment zone, and plants are grown therein. Contaminated water is applied to the input end of the treatment zone and flows through the soil to the output end, thereby being treated by the soil and providing nutrients to the plants. Treated water is collected in a collection area at the bottom of the output end, from where it is removed for use.

7 Claims, 1 Drawing Sheet

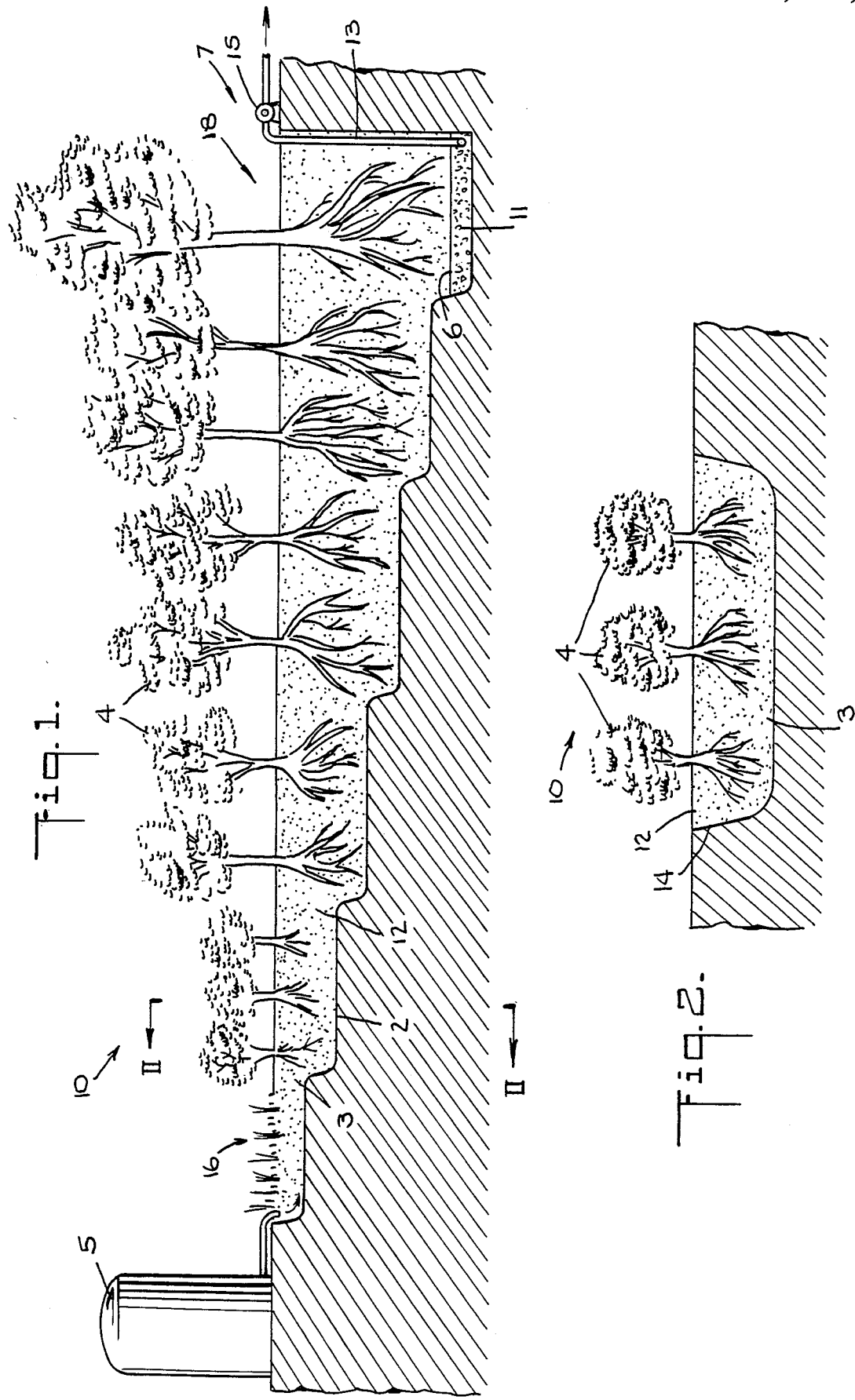

METHOD FOR TREATING WATER

This application is a continuation-in-part of application Ser. No. 863,575, filed May 15, 1986 abandoned.

BACKGROUND OF THE INVENTION

The present invention relates to the field of water treatment, and more particularly to the field of water treatment methods and apparatus in which treatment is carried out without the addition of chemical agents.

Treatment of waste water presents an ongoing problem to all communities. Following standard established by local, state, and federal agencies, communities cannot discharge raw waste water into streams, river, or the like. Water treatment facilities, however, often require large capital expenditures, imposing severe burdens upon the communities involved. Most purification methods now in service treat waste water in ponds, tanks, or the like, with chemical agents being added to accomplish sterilization or purification. Not only are such methods expensive, but also the water cannot be put to any useful purpose during the period of treatment, and, particularly in arid areas, that requirement poses an additional burden upon the community.

Therefore, a pressing need exists to provide a water treatment method that is relatively inexpensive compared to existing methods and which also allows a community to receive benefit from the water during the treatment process.

SUMMARY OF THE INVENTION

It is an object of the present invention to provide a method for treating water without requiring the addition of chemical agents.

A further object of this invention is a method for treating water that does not require the installation of large facilities.

A further object of this invention is a method for treating water that allows a community to receive benefit from the water during the treatment process.

Yet another object of the present invention is apparatus for treating water that requires little expenditure of capital, yet allows water treatment without the addition of chemical agents.

These and other objects are accomplished by the present invention. The water treatment system disclosed herein includes a treatment zone having water-impermeable bottom and side partitions. The bottom partitions are arranged in stepwise or slantwise fashion to descend from an input end to an output end, with a collection area, which may be filled with a porous material such as gravel provided at the bottom portion of the output end. The treatment zone is filled with soil, and plants are grown therein, with plant types selected according to the climatic conditions of the particular location and with regard to the depth of the treatment zone at the growing site. For example, the input end could contain plants requiring little root depth, such as grasses, while the output end could contain deep-rooted plants, such as trees.

Waste water is collected in a tank and then applied to the soil at the input end of the treatment zone. Application of additional waste water, coupled with the force of gravity, causes the water to flow from the input end to the output end of the treatment zone, and as it does so, the water interacts with and is treated by the soil. Treated water is collected in the collection area and removed from the treatment zone for reuse. During the treatment process, the plants within the treatment zone make use of the water thus provided, offering the possibility for the community to receive a benefit from the water during the treatment process, in the form of parks, greenbelts, or growing animal feed.

As should be clear, this method does not require the provision of large-scale capital assets. The method is simple, beneficial, and easy to install.

BRIEF DESCRIPTION OF THE DRAWINGS

FIG. 1 is a cross-sectional side view of an embodiment of the present invention;

FIG. 2 is a cross-sectional end-on view of the embodiment shown, taken along the plane II—II of FIG. 1.

DETAILED DESCRIPTION OF A PREFERRED EMBODIMENT

Am embodiment 10 of the present invention is shown schematically in FIGS. 1 and 2. As seen there, a treatment zone 12 is defined by bottom partitions 2 and side partitions 14. Most conveniently, the treatment zone is formed in a plot of ground by removing a quantity of soil and lining the cavity with a film or sheet, such as polyethylene, polypropylene, or polyvinyl chloride sheeting of about 0.2–1.0 mm. thickness. The side and bottom partitions preferably are formed integrally from single pieces of the film or sheet, but these sections may be formed from separate pieces as desired. Further, the side partitions preferably are relatively vertical, but may be sloped slightly as desired. Of course, the treatment zone can be constructed in any convenient manner known to the art so long as the requirement is followed that the side walls and bottom partitions are water-impermeable.

The treatment zone is filled with soil 3. The type of soil selected may vary according to the climate of the region in which the apparatus is located, or according to the types of soil available. Those familiar with the art will appreciate that the soil also may be selected with regard to the plants which are to be grown therein, as described hereafter.

The treatment zone 12 has an input end 16 and an output end 18. The bottom 2 of the treatment zone slopes downwardly from the input end to the output end, so that the soil depth is considerably greater at the output end. Preferably, the bottom descends in stepwise fashion, as shown, but it may be convenient to arrange the slope in a slantwise fashion. In the embodiment shown, the descent occurs in six steps, in which each step has a length of about 100–200 meters and height of 50–100 centimeters, so that the total length of the treatment zone is about 600–1200 meters, and the maximum soil depth is in a range from about 3–6 meters. The width of the treatment zone is selected with regard to terrain; a 3-meter width, for example, would be relatively narrow, while a crop field could be rather wide.

Soil employable in the present invention may be any kind of soil in which plants can grow. Such soil may contain fertilizers, soil conditioners, microorganisms or the like which are usually added to soil used as a medium for cultivating plants. In case of fertilizers, however, macroelements such as nitrogen, phosphorus and microelements which are ordinarily contained in waste water, are usually not needed. On the contrary, soil conditioners and microorganisms are very useful for achieving the objects of the present invention. Thus, soil conditioners and microorganisms are preferrably added to soil, especially to the soil near the input end or input area. Because plants cultivated near the input end are ordinarily shallow-rooted and their roots are usually exposed to greater moisture than that needed for normal growth, substances either harmful to plants or containing odiferous materials normally appear in the waste water at a relatively high concentration.

The soil conditioners employable in the present invention may include any commercially available conditioners, such as zeolite, charcoal or activated charcoal or cation exchange resins. Also, one could employ materials obtained by subjecting minerals such as clays, rocks and the like to a heat treatment at a temperature of 1000° C. or more or chelated materials and the like. These materials may also be used in any suitable combination as known by those in the art.

Such soil conditioners can change a reductive state in soil to an oxidative state. Reductive states are usually generated in the input area to which waste water containing a considerable amount of undercomposed organic materials is added. That is, the input area is liable to become over-humid due to water added thereto and reductive due to the existence of undercomposed organic materials in addition to over-humidity. Additionally, such organic materials are maloderous.

Even under such soil conditions, if a suitable amount of the soil conditioner is admixed therewith, the liberation of maloderous hydrogen compounds (e.g., hydrogen sulfide, hydrocarbons and the like), which are harmful to roots of plants, is prevented by catalytic decomposition of such hydrogen compounds just after their formation. Normal plant growth is than faciliated, while simultaneously the purification of waste water is accelerated. By way of example, it has been discovered that 1 to 3 parts by weight of a soil conditioner, added per 100 parts by weight of soil in the input area produces the beneficial effects mentioned above.

In case of microorganisms, similar effects are also expected. That is, if microorganisms such as Actinomyces, Streptomyces or Saccharomycetaceae or photosynthetic bacteria such as thiobacillus and the like are artificially inoculated to soil in the input area, organic materials decompose more rapidly. Advantageously, such organic materials usually are malodorous, and thus the addition of microorganisms both preserves the oxidative conditions of the soil and reduces its odor.

These effects are explained in detail in Test Examples 1 and 2 below.

A collection area 11 is provided at the bottom of the output end of the treatment zone, filled with any material suitable for collecting and delivering water, such as gravel. If desired, a collection area partition 6, of a non-woven fabric, may be disposed at the top of this area, to prevent intrusion of plant roots and the like. A water delivery system 7, including conventional piping 13 and pump 15, extends into the collection area for removal of treated water.

The plants 4 are planted in the treatment zone soil. The type of plants employed may be selected according to the climate and needs of the area concerned, combined with the depth of the treatment zone at the area planted. For example, areas of the treatment zone disposed toward the input end should contain plants requiring root systems of relatively shallow depth. such as pasture plants, napiergrass, sugar cane or maize, grading toward deep-rooted plants disposed toward the output end of the treatment zone, such as trees. The type of plant selected also will depend upon the needs of the community. For example, if the community decides to employ the treatment zone to provide a greenbelt in an urban area, plants may suitably be selected from shrubs and trees. Requirements for animal feeds or foods for human consumption will dictate other plantings. Those in the art will appreciate that the present invention can be adapted to provide any of these plant types. Similarly, another interactive factor is the soil available. Preferably, the soil should be selected with regard to the contemplated planting, but a limited selection of soil may dictate the plant selection.

Community waste water is collected in a tank 5. This tank may be conveniently located near the treatment zone as shown, or it can be located some distance therefrom and the waste water piped to the treatment zone. At the tank, dust removal or aeration may be provided, as is known in the art. Further, if it is desired to prevent odors, the waste water may be treated with a deodorant such as a microorganism culture, as also known in the art.

Operation of the present invention proceeds with the application of waste water from the tank 5 to the input end 16 of the treatment zone 12, where waste water is confined within the treatment zone by the side partitions 14 and bottoms 2. As additional waste water is added, and at the urging of gravitational forces, the waste water flows within the treatment zone from the input end to the output end. As it proceeds, the soil filters and treats the water, removing contaminants. Furthermore, the waste water contains many organic compounds that can serve as nutrients for the plants 4, further assisting in the removal of contaminants from the water.

In addition, removal of specific contaminants can be assisted by selection of appropriate plants. Those in the art will appreciate that certain plants concentrate certain compounds otherwise considered contaminants. For example, nepiergrass, a pasture plant, exhibits excellent nitrogen absorption, and thus would serve well at the initial stages of the treatment zone. This point is especially important, given the importance of removing nitrogen from the water. Nepiergrass also absorbs phosphorus and potassium compounds, as do sugar cane and corn. If heavy metals are to be removed, pig weeds, such as Japanese dock or spinach, could be planted in the central area of the zone. Toward the end of the zone, plants such as eucalyptus trees would be appropriate, as that plant possesses a deep root structure.

Treated water proceeds through the treatment zone and collects in collection area 11. At appropriate intervals, this water can be removed by the operation of pumping system 7. The appropriate interval will depend upon the amount of water flowing through the system, and the rate at which the water collects in the collection area.

The results achieved by the method and apparatus of the present invention on soil conditions and microorganisms are now be illustrated by the following Examples.

EXAMPLE 1

A series of square concrete pots having a surface area of 10,000 cm$^2$ and a depth of 50 cm were filled with sand up to a level of 45 cm in height from the bottom of the pots. A multi-perforated plastic pipe having a diameter of 2 inches was inserted in the left side of the respective pots and was used to feed waste water to the pots which permeated the sand. Approximately 1 to 3% by weight of soil conditioners of the types listed in Table 1 were added to the pots and mixed thoroughly with the wastewater-permeated sand.

The wastewater flowrate to the respective pots was regulated so that the water level was maintained at a height of 20 cm from the bottom of the pot.

Approximately 30 seedlings of 25 day old sugar canes having a grass height of 30 cm and 8 seedlings of 15-days old tomatoes having a plant height of 15 cm were then planted in each pot.

At 60 days after planting, growth conditions of both plants were examined and the results were recorded as shown in Table 1.

TABLE 1

| Soil Conditioner added | | Sugar canes | | | Tomatoes | | |
|---|---|---|---|---|---|---|---|
| | | Dead | Abnormal | Normal | Dead | Abnormal | Normal |
| None | | 28 | 2 | 0 | 8 | 0 | 0 |
| Zeolite | 1% | 0 | 0 | 30 | 0 | 0 | 8 |
| | 3% | 0 | 0 | 30 | 0 | 0 | 8 |
| Charcoal | 1% | 0 | 2 | 28 | 0 | 2 | 6 |
| | 3% | 0 | 0 | 30 | 0 | 0 | 8 |
| Cation exchange resin | 1% | 0 | 0 | 30 | 0 | 0 | 8 |
| | 3% | 0 | 0 | 30 | 0 | 0 | 8 |
| Water granulated slag | 1% | 0 | 4 | 26 | 0 | 4 | 4 |
| | 3% | 0 | 0 | 30 | 0 | 0 | 8 |

EXAMPLE 2

The same procedure disclosed in Example 1 was repeated except that 109 cells per 1 cc of culture broth of microorganisms obtained by simultaneously culturing molds such as Actinomyces, Streptomyces and the like, yeasts such as Saccharomyces, and photosynthetic bacteria such as thiobacillus and the like were mixed with waste water to form diluted suspensions of one part microorganism per 1,000, 2,500 and 5,000 parts waste water. The deodorization effects of such microorganism addition is listed in Table 2.

TABLE 2

| Deodorization effects of microorganisms | |
|---|---|
| (a) Not added: | bad smell still came from the pots even after 14 days. |
| (b) 1000 suspension: | no bad smell came from the pots 10 minutes after the inoculation. |
| (c) 2500 suspension: | no bad smell came from the pots 2 hours after the inoculation. |
| (d) 5000 suspension: | no bad smell came from the pots 2½ hours after the inoculation. |

Table 3 lists the effects on growth of sugar cane and potatoes of the microorganism addition described in Example 2.

TABLE 2

| Microorganism Dilution ratio | Sugar canes | | | Tomatoes | | |
|---|---|---|---|---|---|---|
| | Dead | Abnormal | Normal | Dead | Abnormal | Normal |
| (a) Not Added | 28 | 2 | 0 | 8 | 0 | 0 |
| (b) 1000 | 0 | 2 | 28 | 0 | 0 | 8 |
| (c) 2500 | 0 | 0 | 30 | 0 | 0 | 8 |
| (d) 5000 | 0 | 0 | 30 | 0 | 2 | 6 |

As is clear from the above results, the intended effects can be obtained by adding soil conditioners and inoculating artificially microorganisms.

Clearly, the present invention can be adaptable to many forms. For example, the treatment zone can be designed having a relatively narrow width to provide a greenbelt in an urban environment. Alternately, a relatively wide field can be provided, for example by employing appropriate piping mechanisms if the treatment zone is to serve as a pasture or crop area. These and other modifications can be made to the present invention without departing from its scope, which is defined solely by the claims appended hereto.

I claim:

1. A method for treating contaminated water, comprising the steps of:
providing a treatment zone having water-impermeable side and bottom walls, said treatment zone being located beneath the surface of the earth, said bottom walls descending downward in a series of steps, the bottom surface of each of said steps being substantially horizontal, from an input end to an output end, said treatment zone containing only soil or other constituents naturally occurring in said zone or artificially added thereto and having plants growing therein which vary from shallow-rooted plants positioned near the input end to deep-rooted plants positioned near the output end;
applying the contaminated water to said soil at said input end;
allowing the water to flow through said soil from said input end solely by force of gravity;
collecting treated water at the bottom portion of said output end; and
receiving said treated water.

2. The method for treating contaminated water according to claim 1, wherein said treatment zone to said input end contains soil and at least one member selected from soil conditioners and microorganisms artificially added thereto.

3. The method for treating contaminated water of claim 1, wherein said plants growing within said treatment zone are selected such that the root structure of said plants growing in a selected area of said treatment zone have a root structure extending downward to a depth substantially equal to the depth of said soil at said selected area.

4. The method for treating contaminated water of claim 1, wherein said plants being grown nearest said input end of said treatment zone are selected from among the group consisting of pasture plants, napier-grass, sugar cane and maize.

5. The method for treating contaminated water of claim 1, wherein said plants being grown in a a portion of said treatment zone intermediate between said input end and said output end are selected from among the group consisting of pigweed, Japanese dock and spinach.

7. The method for treating contaminated water of claim 1, wherein said plants being grown nearest said output end of said treatment zone are eucalyptus trees.

7. The method for treating contaminated water of claim 1, wherein said plants being grown nearest said input end of said treatment zone are selected from among the group consisting of pasture plants, napiergrass, sugar cane and maize, said plants being grown in a portion of said treatment zone intermediate between said input end and said output end are selected from among the group consisting of pigweed, Japanese dock and spinach, and said plants being grown nearest said output end of said treatment zone are eucalyptus trees.

* * * * *

UNITED STATES PATENT AND TRADEMARK OFFICE
CERTIFICATE OF CORRECTION

PATENT NO. : 4,839,051
DATED : June 13, 1989
INVENTOR(S) : Teruo HIGA

It is certified that error appears in the above-identified patent and that said Letters Patent is hereby corrected as shown below:

ABSTRACT, line 5, change "input and" to --input end--.

Column 1, line 13, change "standard" to --standards--.

Column 1, line 15, change "river" to --rivers--.

Column 3, line 64, change "depth.  such" to --depth, such--.

Column 5, line 53, change "TABLE 2" to --TABLE 3--.

Column 6, line 42, change "zone to said" to --zone at said--.

Column 6, line 68, change "in a a portion" to --in a portion--.

Signed and Sealed this

Twenty-first Day of November, 1989

Attest:

JEFFREY M. SAMUELS

Attesting Officer          Acting Commissioner of Patents and Trademarks